(12) United States Patent
Remy et al.

(10) Patent No.: US 11,187,104 B2
(45) Date of Patent: Nov. 30, 2021

(54) IN-SITU HEATING/COOLING TOOL FOR TURBINE ASSEMBLY ON A SHAFT

(71) Applicant: PRATT & WHITNEY CANADA CORP., Longueuil (CA)

(72) Inventors: Patrice Remy, St-Hubert (CA); Pierre Gaudet, Montreal (CA)

(73) Assignee: PRATT & WHITNEY CANADA CORP., Longueil (CA)

( * ) Notice: Subject to any disclaimer, the term of this patent is extended or adjusted under 35 U.S.C. 154(b) by 30 days.

(21) Appl. No.: 16/665,406

(22) Filed: Oct. 28, 2019

(65) Prior Publication Data

US 2021/0123359 A1  Apr. 29, 2021

(51) Int. Cl.
*F01D 5/34* (2006.01)
*F01D 25/12* (2006.01)

(52) U.S. Cl.
CPC .......... *F01D 25/12* (2013.01); *F05D 2220/32* (2013.01); *F05D 2230/40* (2013.01); *F05D 2230/60* (2013.01)

(58) Field of Classification Search
CPC . F01D 5/34; F01D 5/048; F01D 5/085; F01D 11/001; F01D 25/12; F01D 5/026; F01D 5/04; F01D 5/06; F05D 2240/20
See application file for complete search history.

(56) References Cited

U.S. PATENT DOCUMENTS

| | | | | |
|---|---|---|---|---|
| 4,460,527 A | * | 7/1984 | Kato | B28B 1/002 156/89.27 |
| 4,722,630 A | * | 2/1988 | Fang | F01D 5/025 228/138 |
| 4,778,345 A | * | 10/1988 | Ito | F01D 5/025 416/241 B |
| 4,798,320 A | * | 1/1989 | Fang | F01D 5/025 228/124.1 |
| 4,836,750 A | | 6/1989 | Modafferi | |
| 9,062,565 B2 | | 6/2015 | Mahan | |
| 10,273,972 B2 | | 4/2019 | Maalouf | |
| 10,280,768 B2 | | 5/2019 | Freeman | |
| 2005/0036898 A1 | * | 2/2005 | Sweetland | F01D 5/048 419/6 |
| 2012/0174546 A1 | * | 7/2012 | Tornblom | B04B 5/12 55/461 |
| 2015/0078905 A1 | * | 3/2015 | Albuzat | F16D 1/068 416/213 R |
| 2015/0104318 A1 | * | 4/2015 | Koch | B23K 1/20 416/213 R |
| 2019/0186265 A1 | | 6/2019 | Friedman | |

* cited by examiner

*Primary Examiner* — Long T Tran
(74) *Attorney, Agent, or Firm* — Norton Rose Fulbright Canada LLP

(57) ABSTRACT

A method of assembling a first part to a second part while applying thermal energy to at least one of the parts. The application of thermal energy is terminated when the first part and second part are in a completed assembly position relative to each other. The thermal energy absorbed by the at least one of: the first part; and the second part is then dissipated until the first part and second part are engaged in an interference fit.

9 Claims, 4 Drawing Sheets

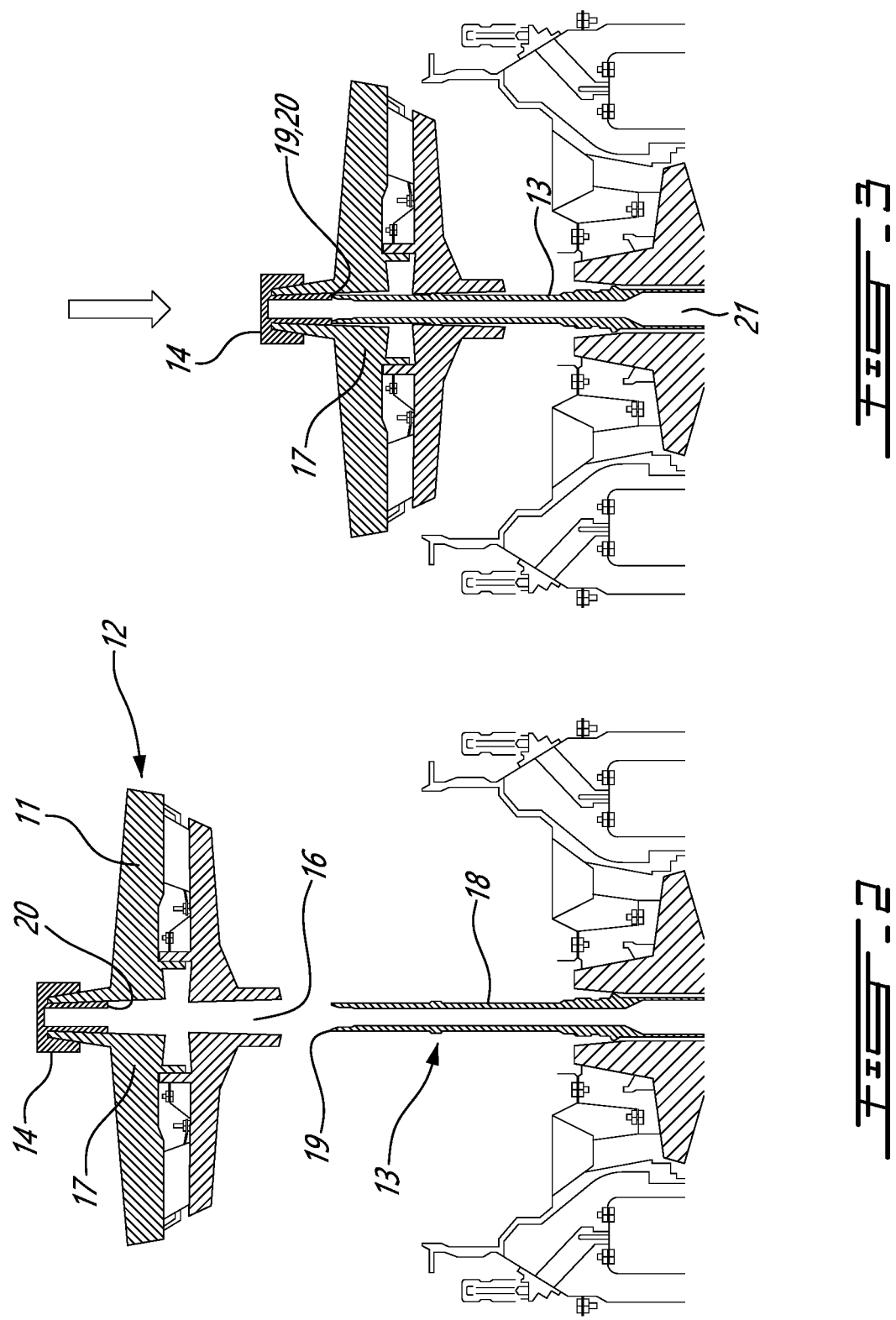

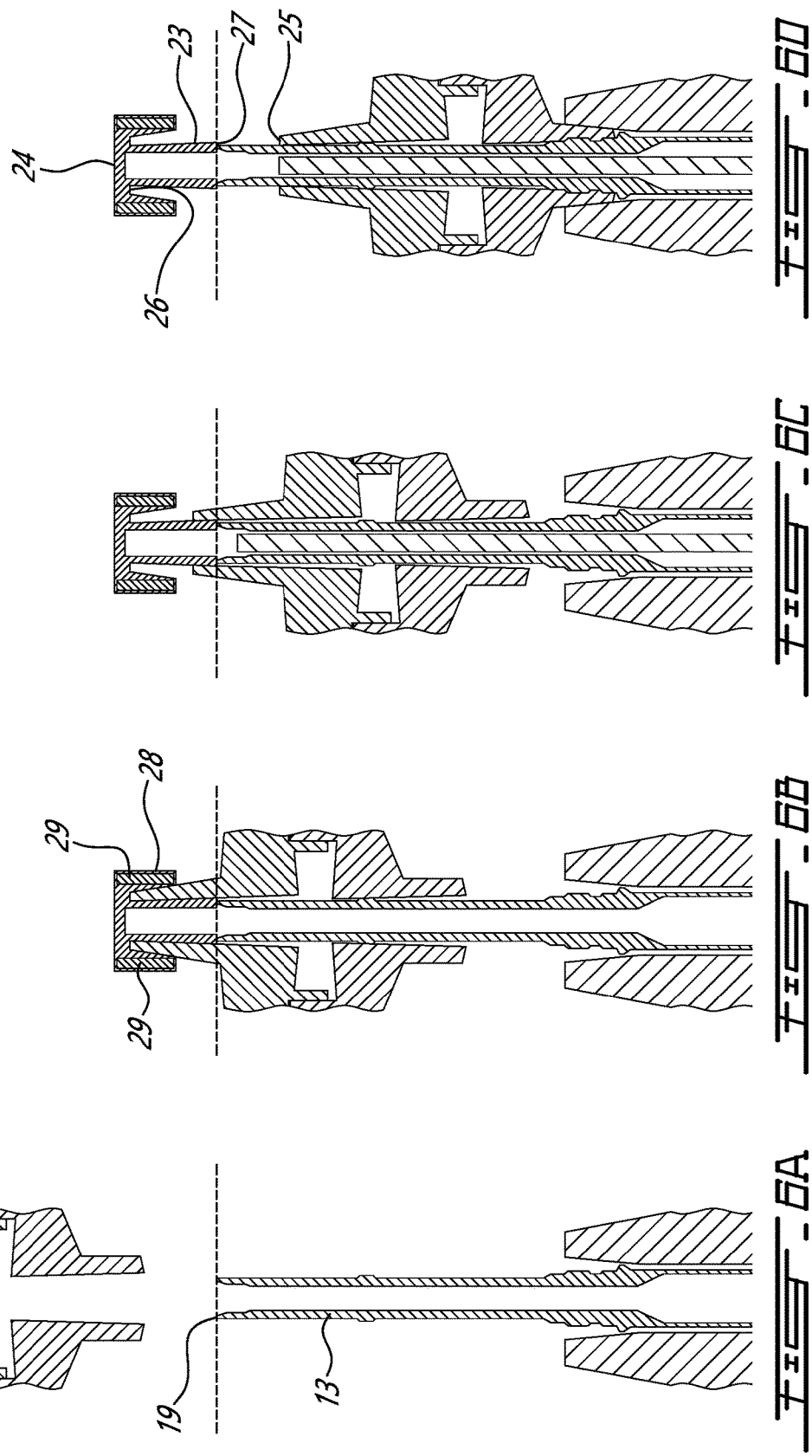

IN-SITU HEATING/COOLING TOOL FOR TURBINE ASSEMBLY ON A SHAFT

TECHNICAL FIELD

The disclosure relates generally to a method for heating/cooling parts during assembly of a turbine on a shaft which reduces the risk of damaging tightly fitted components.

BACKGROUND

Assembly of mechanical components with an interference fit can involve the application of force, thermal expansion and thermal contraction or a combination thereof. An interference fit allows simple connection geometry and the transmission of high levels of torque with the applied stresses more evenly distributed over the engaging surfaces of the connected components.

For example, in assembling a gas turbine engine, a turbine rotor having rotor hub with bore of an internal diameter is fitted on an external diameter of a hollow coaxial shaft. The internal and external diameters are selected with a minimal clearance to achieve an interference connection after assembly is completed.

Application of heat to the rotor causes the metal of the rotor hub to expand thereby increasing the internal diameter sufficiently to closely fit on the external diameter of the shaft. The metal of the shaft can also be cooled to decrease the external diameter sufficiently to fit on the internal diameter of the hub.

The mechanical components may be heated with hot air locally or in an oven. Heat may also be applied with various portable heaters using electrical resistance heaters and conduction. For electrically conductive metal components, magnetic induction heaters may be preferred due to energy efficiencies, access constraints and to minimize heating of adjacent elements and fixtures.

Especially with large heavy components or when clearance is limited, the assembly process can be time consuming. Assembly may require heating the component in a fixture, removal of the component from the heat source and transport of the hot component to the assembly station for fitting to another component.

Once the component is removed from an oven or the heater is removed from the heated component, cooling of the component occurs as heat is radiated into the ambient environment. The loss of heat during the time taken for transport, fitting and final assembly causes the heated component to contract as it cools.

Accordingly the component may have to be overheated to compensate for the contraction during assembly which at best represents energy inefficiency and at worst can lead to physical damage during assembly or can detrimentally affect the material properties of the heated component. If the heated component contracts excessively, the component may require re-heating.

Due to thermal contraction or cooling, the assembly of inappropriately sized components using excessive force may result in misalignment, localized stress concentrations or physical damage to the components, for example, marring or scratching of matching surfaces.

The heating of components ideally provides a sufficiently long period of time or assembly margin within which the components can be heated, transported, fitted and assembled in a final position. Ideally the components are assembled freely with minimal interference and with minimal force required. Improvement is desirable to minimize the time lag between heating and final assembly, and during assembly to reduce the risk of damaging components that have geometries that are not expanded or contracted sufficiently.

SUMMARY

The disclosure describes a method comprising: fitting a first part to a second part while applying thermal energy to at least one of: the first part; and the second part; terminating the application of thermal energy when the first part and second part are in a completed assembly position relative to each other; and dissipating thermal energy, absorbed by the at least one of: the first part; and the second part, until the first part and second part are engaged in an interference fit.

In accordance with a further aspect, there is provided a method of assembling a turbine rotor on a coaxial shaft of a gas turbine engine, the method comprising: inserting a heater plug into an internal bore of a turbine rotor hub; actuating the heater plug to heat the internal bore of the turbine rotor hub to a predetermined hub assembly temperature; aligning the internal bore to an external surface of the coaxial shaft; fitting the internal bore of the turbine rotor hub onto the external surface of the coaxial shaft; sliding the turbine rotor hub axially relative to the coaxial shaft from a fitted position to a final assembled position; engaging a distal end of the coaxial shaft with a proximal end of the heater plug; and dislodging the heater plug from the internal bore of the turbine rotor hub.

In a further aspect the disclosure describes a heater plug for assembling a turbine rotor on a coaxial shaft of a gas turbine engine, the heater plug comprising: an alignment sleeve having an external diameter adapted for engaging an internal bore of the turbine rotor.

In a further aspect the disclosure describes a cooling rod for assembling a turbine rotor on a coaxial shaft of a gas turbine engine, the cooling rod comprising: an internal rod having an external diameter adapted for engaging an internal diameter of the coaxial shaft. Embodiments can include combinations of the above features.

Further details of these and other aspects of the subject matter of this application will be apparent from the detailed description included below and the drawings.

DESCRIPTION OF THE DRAWINGS

FIGS. 2 to 5 show axial cross-sectional views of a turbine rotor being progressively assembled with a spigot connection to a coaxial shaft using a heating plug within the turbine rotor hub and an internal cooling rod within the shaft as follows:

FIG. 2 shows the turbine rotor with a coaxial heating plug aligned on the central axis above a hollow coaxial shaft.

FIG. 3 shows the hub of the turbine rotor with heating plug fitted onto the upper end of the coaxial shaft.

FIG. 4 shows an intermediate position of the turbine rotor after sliding downward axially whereby the upper end of the shaft dislodges the heating plug from the internal bore of the turbine rotor hub.

FIG. 5 shows the turbine rotor in a final assembled position on the coaxial shaft with the heating plug completely dislodged from the turbine rotor by engagement with the upper end of the shaft.

FIGS. 6 (a) to 6(d) show detailed views of the progressive dislodging of the heating plug from the turbine rotor hub as in FIGS. 2 to 5.

DETAILED DESCRIPTION

Figure 1:
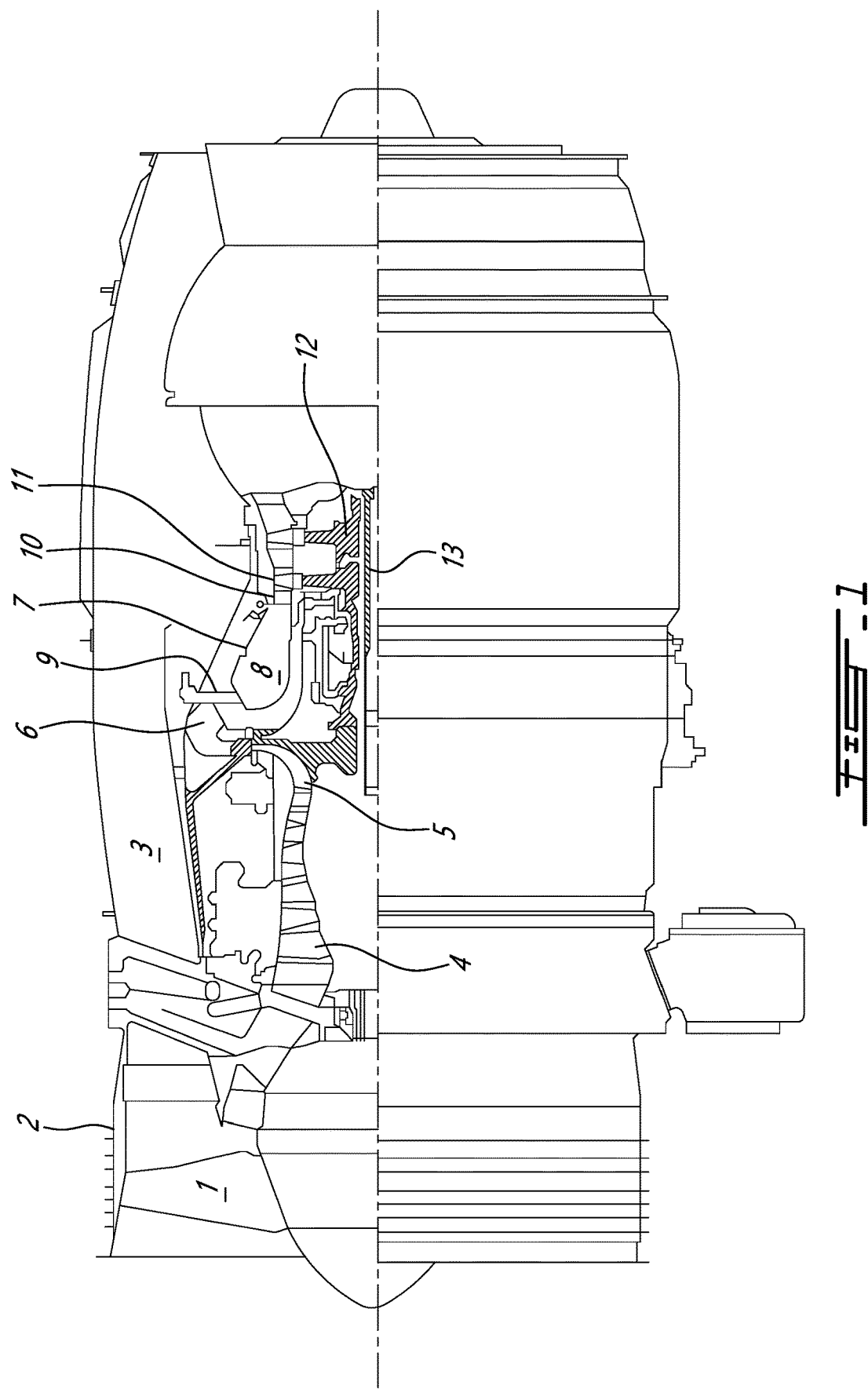
FIG. 1 shows an axial cross-section view of a turbo-fan gas turbine engine.

FIG. 1 shows an axial cross-section through an aircraft engine. According to the illustrated embodiment, the aircraft engine is a turbo-fan gas turbine engine. However, it is understood that the aircraft engine could adopt various other forms. For instance, it could be a turboshaft, a turboprop or even a compounded engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling the turbines to eventually mix with the hot gases from the combustor and pass over the nozzle guide vane 10 and turbine blades 11 before exiting the tail of the engine as exhaust.

The present description and drawings relate in general to a method of fitting a first part to a second part while applying thermal energy to the first part and/or the second part. One or both parts can be prepared for fitting by pre-applying thermal energy before fitting begins. The application of thermal energy is terminated when the first part and second part are in a completed assembly position relative to each other. Thermal energy that has been absorbed by the first part and/or the second part is dissipated, until the first part and second part are engaged in an interference fit. Thermal energy can comprise heat or cooling, or one part can be heated while the other part is also cooled at the same time.

In particular, the example described and illustrated herein relates to the assembly of a rotor component, such as the turbine rotor 12, upon a coaxial shaft 13 during manufacture. As will be seen hereinafter, the turbine rotor 12 can be continuously heated while the shaft 13 is cooled during the overall assembly process. FIGS. 2 to 5 show axial cross-sectional views of an exemplary turbine rotor 12 with two rows of turbine blades 11 being progressively assembled with a spigot connection to a coaxial shaft 13.

Figure 5:
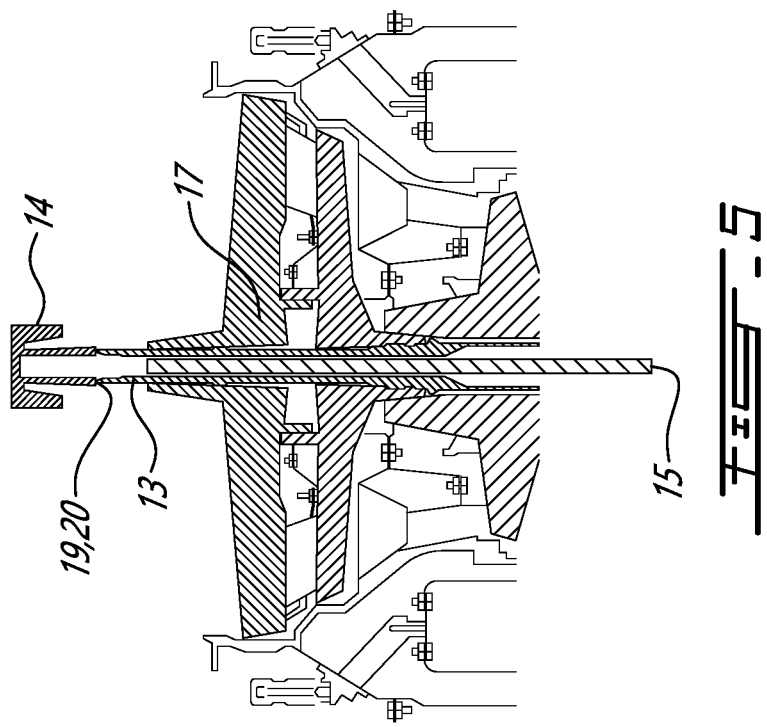
Figure 4:
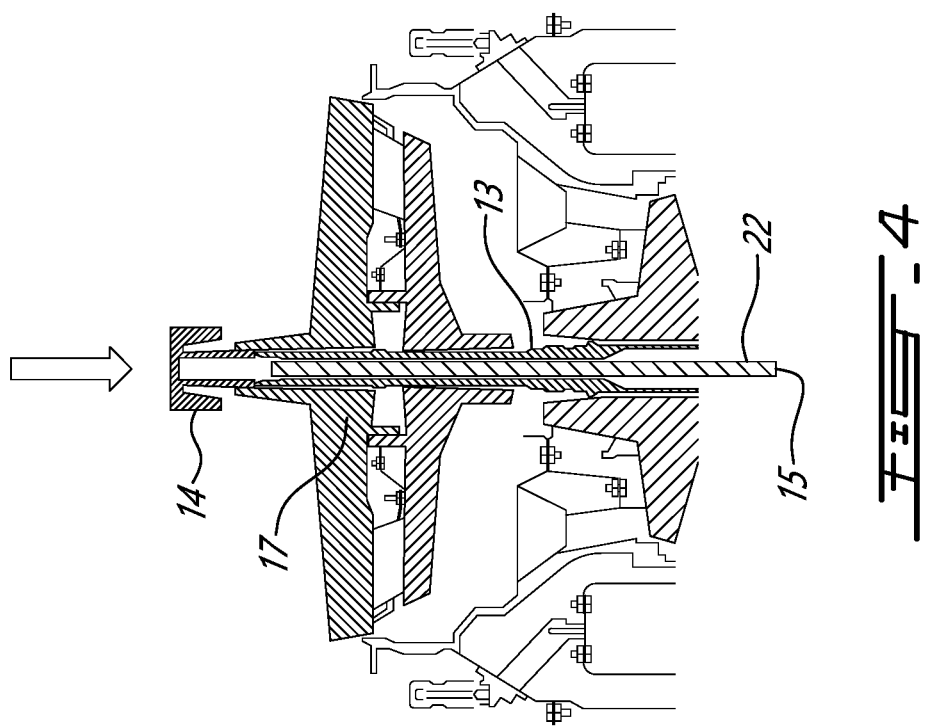

In FIGS. 2-5 a heating plug 14 is disposed within the turbine rotor 12. In FIGS. 4-5 an alternative or additional contacting method uses an internal cooling rod 15 mounted within the hollow coaxial shaft 13.

As indicated in the detail view of FIG. 6(A), the method of assembling the turbine rotor 12 to the coaxial shaft 13 commences with inserting the heater plug 14 into the internal bore 16 of the turbine rotor hub 17. As shown in FIG. 2, the internal bore 16 is coaxially aligned with the external surface 18 of the coaxial shaft 13. An assembly fixture (not shown) may be used for accuracy during alignment and fitting.

The heater plug 14 may be actuated before, during or after alignment to heat the internal bore 16 of the turbine rotor hub 17 to a predetermined assembly hub temperature. The heater plug 14 may be an induction heater, an electric resistance heater or a hot air heater, for example.

FIG. 3 shows the internal bore 16 of the turbine rotor hub 17 fitted onto the external surface 18 of the coaxial shaft 13. In the example illustrated in the drawings, the internal bore 16 of the turbine rotor hub 17 and the external surface 18 of the coaxial shaft 13 are substantially conical and comprise a spigot connection which are joined together in an interference fit when assembly is completed.

Preferably the heating of the rotor hub 17 to a predetermined assembly hub temperature has expanded the diameter of the internal bore 16 sufficiently so that application of substantial axial force is not needed and an accurate alignment can be maintained.

Starting at the initial fitted position shown in FIG. 3, axial force is applied if necessary to slide the turbine rotor hub 17 (i.e. in the direction of the downward arrow) axially relative to the coaxial shaft 13 to the intermediate position shown in FIG. 3. Further axial force may be applied to slide the turbine rotor hub 17 axially relative to the coaxial shaft 13 from the intermediate position (FIG. 4) to the final assembled position shown in FIG. 5.

As shown in FIGS. 4 and 6(C), during the axial movement of the turbine rotor hub 17, the distal end 19 of the coaxial shaft 13 engages and abuts the proximal end 20 of the heater plug 14. Further axial motion of the turbine rotor hub 17 relative to the coaxial shaft 13 to the final assembled position shown in FIG. 5 results in completely dislodging the heater plug 14 from the internal bore 16 of the turbine rotor hub 17.

FIGS. 4 and 5 show a variant including the insertion of a cooling rod 15 into the internal bore 21 (see FIGS. 2-3) of the tubular or hollow coaxial shaft 13. By contracting the diameter of the external surface 18 (FIG. 2) of the coaxial shaft 13 with the internal cooling rod 15, a further clearance can be achieved to fit the components together and avoid the need for excessive axial force.

The cooling rod 15 includes an internal probe having an external diameter 22 adapted for engaging the internal diameter 21 of the coaxial shaft 13. The cooling rod 15 is actuated to cool the internal bore 21 of the coaxial shaft 13 to a predetermined shaft assembly temperature. The cooling rod 15 can be a refrigerant circulating heat exchanger or a simple liquid nitrogen containment vessel depending on the cooling requirements and material geometries.

Reference is made to FIGS. 6(A) to 6(D) showing the details of the example method and device described herein. The heater plug 14 has an alignment sleeve 23 having an external diameter adapted for engaging the internal bore 16 (FIG. 2) of the rotor hub 17. The heater plug 14 may include a mounting flange 24 extending radially outwardly from the alignment sleeve 23. The purpose of the mounting flange 24 is to engage the distal end 25 of the turbine rotor 12 with a distal abutment surface 26. The accurate positioning of the heater plug 14 on the turbine rotor 12 ensures that heating application is controlled and repeatable. The proximal abutment surface 27 of the alignment sleeve 23 is adapted to engage the distal end 19 of the coaxial shaft 13.

An external shroud 28 extends radially outwardly from the mounting flange 24. The external shroud 28 encloses an annular heater device 29. Alternatively or in addition, the alignment sleeve could include a heater device. The geometry of the turbine rotor 12 and the areas of the turbine shroud that are to be heated will determine the geometry of the heater plug 14 and the arrangement of heating device 29.

According to at least one aspect, there is provided a rotor spigot fit inner diameter high temperature in-situ heating plug that will continuously provide heat to the fit location on the rotor while the rotor is being handled and put into position for assembly. The heating plug heats the inside and the outside of the part fit to increase the temperature rise by avoiding temperature waste to the environment. When the rotor is lowered onto the shaft, the heating plug is pushed out of the rotor by the shaft as the rotor is being lowered.

The same principles can be used for continuous cooling of an internal shaft featuring an outer diameter interference fit. For instance, a cooling rod may be kept inside a hollow shaft during the entire assembly sequence while the hot part (e.g. the rotor) is assembled into position over the shaft. The combination of continuous heating and/or cooling during assembly provide assembly time margin to assemble rotor with very tight fits freely.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of assembling a rotor on a shaft of a gas turbine engine, the method comprising:
    inserting a heater plug into an internal bore of a rotor hub of the rotor;
    inserting a cooling rod into an internal bore of the shaft;
    actuating the heater plug to heat the rotor hub to a predetermined hub assembly temperature;
    actuating the cooling rod to cool the internal bore of the shaft to a predetermined shaft assembly temperature, wherein the cooling rod comprises one of: a refrigerant circulating heat exchanger; and a liquid nitrogen containment vessel;
    aligning the internal bore of the rotor hub to an external surface of the shaft;
    fitting the internal bore of the rotor hub onto the external surface of the shaft;
    sliding the rotor hub axially relative to the shaft from a fitted position to a final assembled position;
    engaging a distal end of the shaft with a proximal end of the heater plug; and
    dislodging the heater plug from the internal bore of the turbine rotor hub.

2. The method according to claim 1 wherein the internal bore of the rotor hub and the external surface of the coaxial shaft comprise a spigot connection.

3. The method according to claim 1 wherein the heater plug comprises one of: an induction heater; an electric resistance heater; and a hot air heater.

4. The method according to claim 1, wherein the rotor hub is heated while the internal bore of the shaft is cooled.

5. The method according to claim 1, wherein the heater plug is actuated before aligning the internal bore of the rotor hub to the external surface of the shaft.

6. The method according to claim 5, wherein the heater plug continued to be actuated during the step of aligning the internal bore of the rotor hub to the external surface of the shaft.

7. The method according to claim 1, wherein the cooling rod includes an internal probe having an external diameter surface adapted for engaging an internal diameter surface of the shaft.

8. The method according to claim 1, wherein the heater plug has an alignment sleeve having an external diameter surface adapted for mating engagement with the internal bore of the rotor hub.

9. The method according to claim 8, wherein the heater plug includes a mounting flange extending radially outwardly from the alignment sleeve.

* * * * *